Oct. 9, 1951 W. W. BOWMAN 2,570,516
BOTTLE VENDING MACHINE
Filed May 3, 1946 6 Sheets-Sheet 2

INVENTOR.
Wade W. Bowman
BY Morgan, Finnegan & Durham
ATTORNEYS

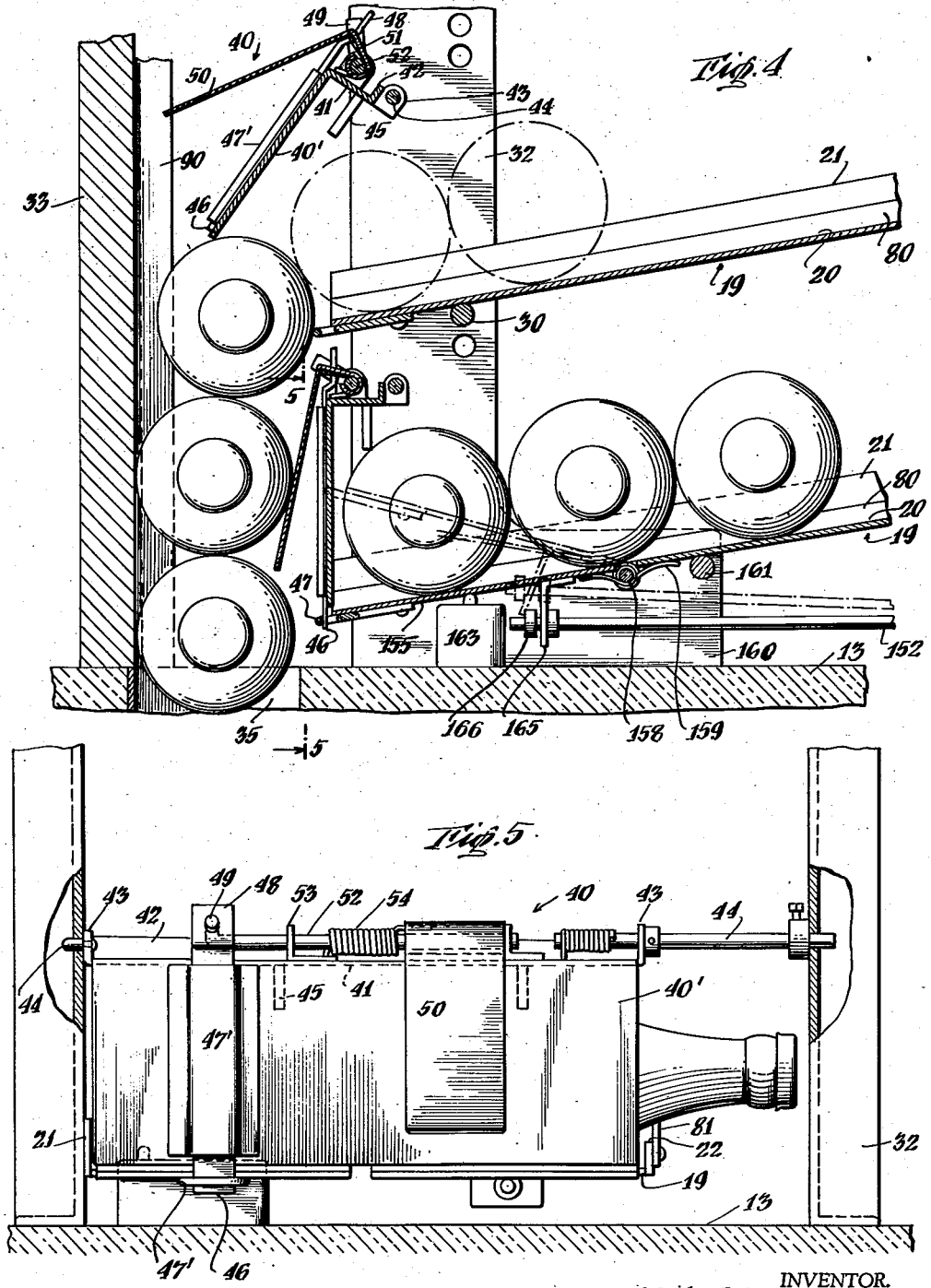

Oct. 9, 1951 — W. W. BOWMAN — 2,570,516
BOTTLE VENDING MACHINE
Filed May 3, 1946 — 6 Sheets-Sheet 4
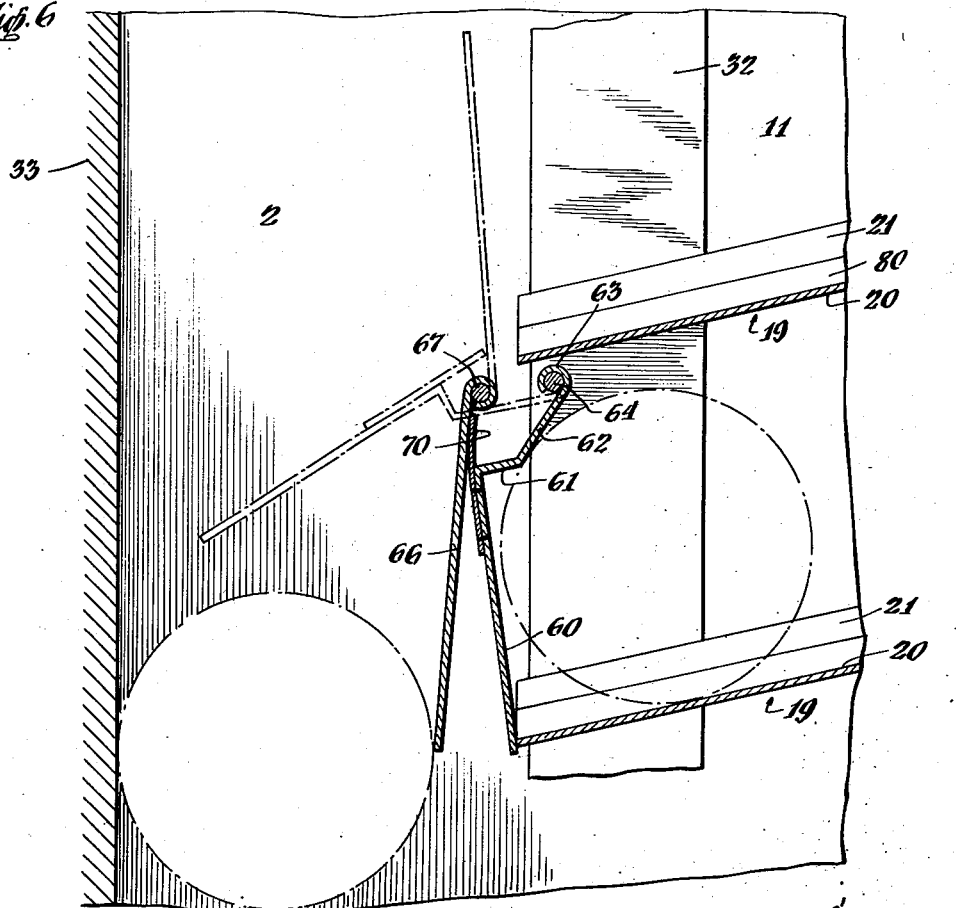
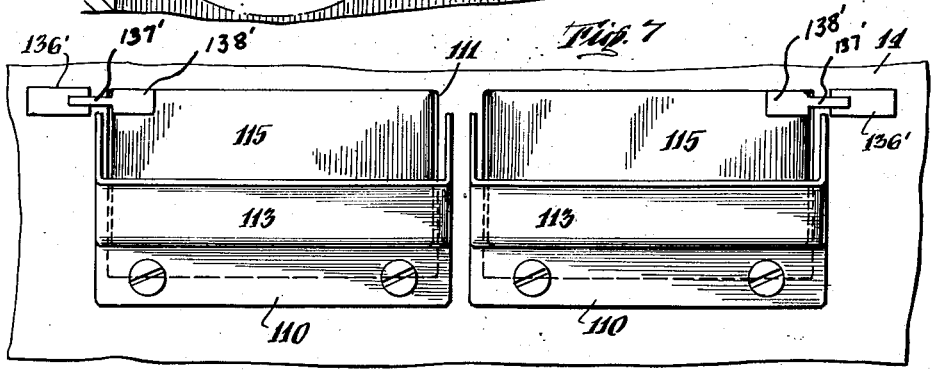
INVENTOR.
Wade W. Bowman
BY Morgan, Finnegan & Durham
ATTORNEYS

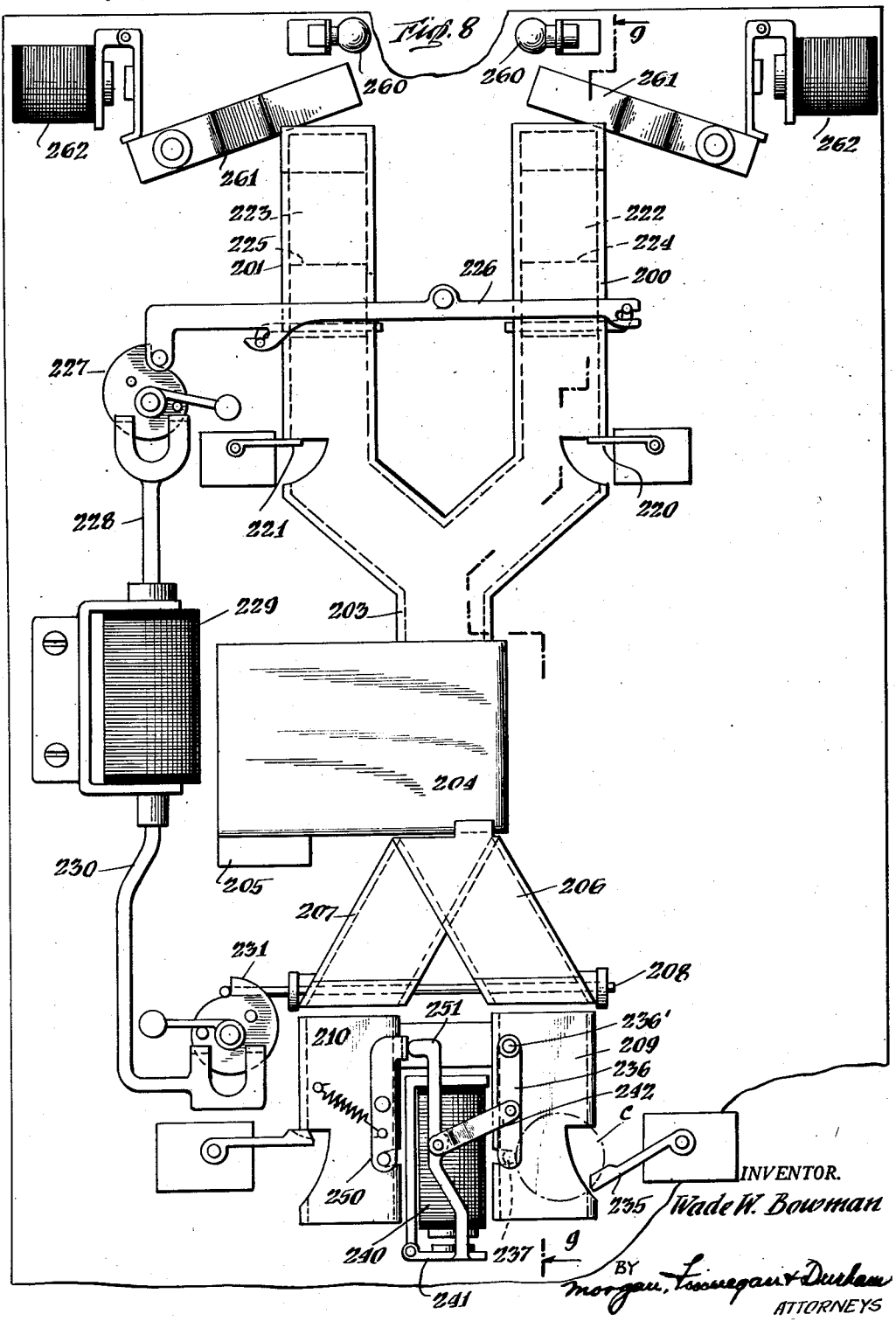

Oct. 9, 1951     W. W. BOWMAN     2,570,516
BOTTLE VENDING MACHINE
Filed May 3, 1946     6 Sheets-Sheet 6
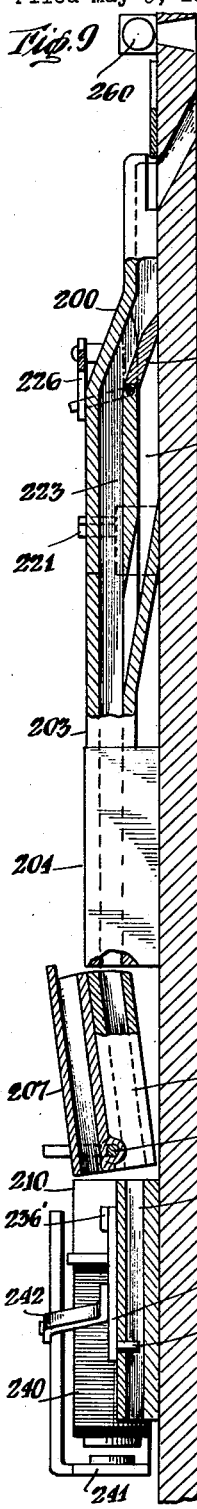
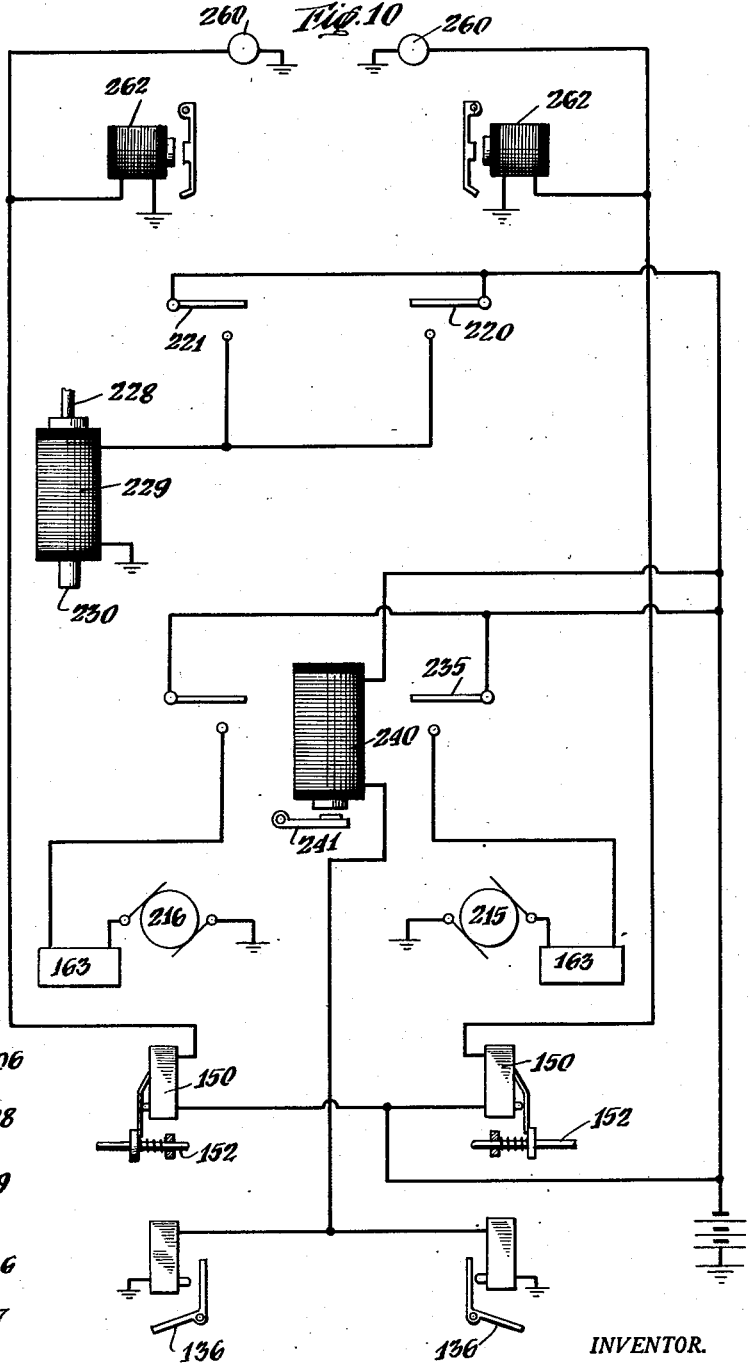
INVENTOR.
Wade W. Bowman
BY
Morgan, Finnegan & Durham
ATTORNEYS

UNITED STATES PATENT OFFICE 2,570,516

BOTTLE VENDING MACHINE

Wade W. Bowman, Dallas, Tex.

Application May 3, 1946, Serial No. 667,102

13 Claims. (Cl. 312—46)

The invention relates to vending machines and more particularly to a new and useful machine for automatically vending bottles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is an enlarged fragmentary detail in vertical section of the tray and gate mechanism for storing and feeding bottles;

Fig. 5 is a vertical section on line 5—5 of Fig. 4;

Fig. 6 is a fragmentary transverse vertical section of a modified form of gate and control for the bottle trays; and Fig. 7 is an elevation of a modified form of switch mounting on the delivery door;

Fig. 8 is a partially diagrammatic front elevation of a coin control mechanism for use with the invention;

Fig. 9 is a fragmentary vertical section on line 9—9 of Fig. 8; and

Fig. 10 is a wiring diagram of said coin control.

Figure 1:
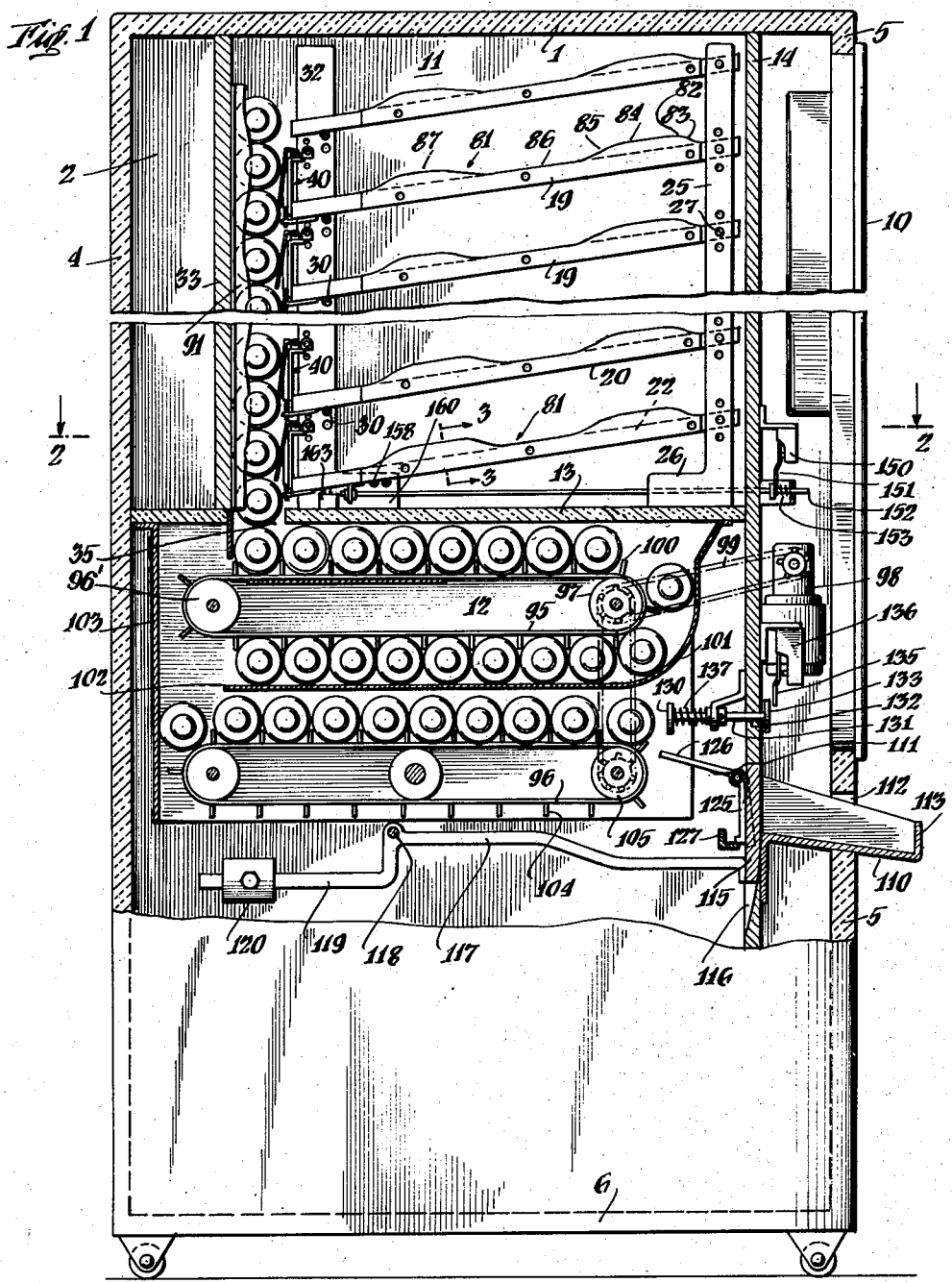
Fig. 1 is a fragmentary side elevation of a machine embodying the invention, the principal mechanisms thereof being shown in section.

The invention is directed to providing an improved bottle vending machine, preferably coin-controlled, which is adapted with a minimum of change or adjustment to handle a very wide variety of sizes and shapes of bottles. One object of the invention is to provide such a machine having very large bottle-holding capacity wherein a plurality of sizes and shapes of bottles may be vended as selected by the customer so that beverages or liquids of different flavors or manufacture can be obtained from the same machine. Another object of the invention is to provide such a machine which is designed to be serviced or supplied with fresh stock with a minimum of difficulty and interruption.

Another major object is to provide a bottle vending machine wherein a reserve supply of bottles is always maintained at the desired vending temperature regardless of the number of bottles which have been withdrawn from the machine. That is, my invention provides for maintaining a reserve quantity of chilled bottles at all times so that when the machine has delivered bottles down to the reserve quantity, that quantity will remain in the machine and be kept at the vending temperature. Consequently, after the machine has been reloaded with fresh bottles, it is immediately ready to deliver a properly chilled bottle to the next customer without requiring a chilling period to cool off the new supply before vending is recommenced. This feature of the invention makes it possible to obtain promptly a properly chilled drink regardless of the time interval between exhaustion of the available supply and the furnishing of a new supply and also independent of the number of bottles which have been supplied to the machine at any given time. No counting means or pre-setting of any control means for a predetermined number of bottles is required.

Another object is to provide a bottle vending machine in which the maximum amount of work is performed by natural gravity movements of the bottles thus requiring the minimum expenditure of power and providing for maximum simplici y of construction and maintenance. In this aspect of the machine, the invention further provides for insuring that the bottles will always move evenly on their sides without jamming, twisting or bridging, regardless of the external contour or profile of the various bottles, so long as their general cross-section is essentially circular. Means are also provided for insuring that one and only one bottle will be delivered from the machine at a time, this feature of the invention including an improved delivery door mechanism, which mechanism also is designed to operate to prevent access into the interior of the machine adjacent the delivery port.

Generally described, the vending machine comprises a closed cabinet having one or more delivery doors to which the bottles are fed one-by-one on individual step-by-step motor-driven conveyors, said conveyors and the feeding units therefor being arranged in parallel banks within the machine. By suitable coin-controlled circuits the machine is so designed that only one of the several bottle conveyors will be actuated at one time, depending upon the flavor selected by the customer when the coin is inserted. If all banks of the machine are loaded with bottles containing the same beverage, said coin-control mechanism is designed to successively actuate the conveyors in turn so that bottles will be withdrawn uniformly from each of the several supply magazines containing same.

Each of the bottle conveyors is housed within a refrigerated chamber so that all of the bottles on each conveyor will be maintained at the desired low temperature. In the upper part of the cabinet or casing above a bottle conveyor, the bottles to be supplied to said conveyor are carried in a plurality of superposed slightly inclined trays or shelves, the lower ends of which all communicate with a vertically-disposed delivery chute which feeds the bottles one-by-one onto the upper flight of the chilled conveyor. The movements of the bottles in said trays and in said vertical delivery chute are effected entirely by gravity and control means, governed by the weight of the bottles, are provided whereby the bottles lying in the uppermost tray are all fed out first and thereafter the bottles in each successively lower tray are fed into the vertical chute until the entire number of bottles in the trays are delivered one-by-one to the conveyor below. When the last bottle in the upper or magazine portion of the cabinet has been fed to the chilled conveyor, the downward movement of said last bottle automatically causes the conveyor motor to be shut off so that that conveyor will not operate again until a fresh supply of bottles has been furnished to the magazine trays above it. By this means maintenance of a chilled reserve of bottles is assured.

It will be understood that the foregoing general description and the following detailed description as well are exemplary and explanatory but are not restrictive of the invention.

Figure 2:
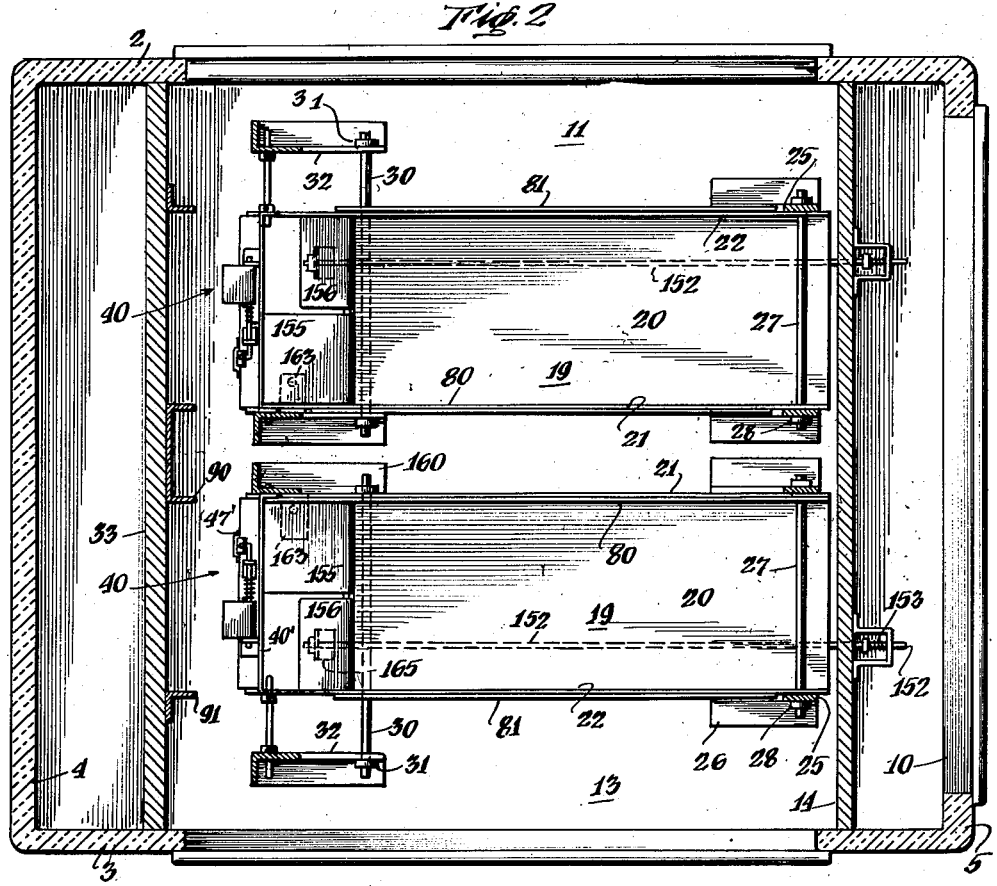
Fig. 2 is a horizontal section on line 2—2 of Fig. 1.

Referring now in detail to the present preferred embodiment illustrated by way of example in the accompanying drawings, the vending machine, as shown in Figs. 1 and 2, is designed to accommodate two banks or units of bottle storing and feeding equipment arranged in parallel and this is the preferred form of the machine, although it will be understood that a higher number of such units may be provided as desired in such cases and on the other hand, many of the improved features of the invention are also applicable to a single unit. As shown, the machine contains an outer rectangular cabinet having top 1, side walls 2 and 3, rear wall 4, front wall 5 and bottom 6. About two-thirds of the upper portion of the front wall 5 is cut away to provide an opening for a front access door 10, which is suitably hinged to open from one side of the cabinet, the inner face of the door being flush with the inner face of the front wall 5 and the outer face thereof extending beyond the outer face of the wall 5 and provided with overlapping edges as shown. Any suitable sealing means such as rubber beading around the closing edges of the door is preferably provided for cushioning and sealing same when closed.

Each of the two bottle-storing and conveying units shown is identical in construction so that, for convenience, only one will be described in detail. Each of said bottle-storing and conveying units comprises an upper or storage section generally indicated at 11 and a lower chilling, conveying and delivery section generally indicated at 12. The storage unit 11 lies above and is supported upon an internal horizontal dividing platform 13 which extends from the rear wall 4 of the cabinet, along the inner side of both side walls and abuts against an inner vertical front wall 14. Said front wall 14 is parallel to the front wall 5 of the machine and spaced inwardly therefrom to provide a permanent insulating shield and closure between the door 10 and the interior chilled portion of the machine. The conveying unit 12, also mounted within or to the rear of the inner front wall 14 and generally supported by suspension from the horizontal dividing platform 13 and the space housed by the walls 2, 3, 4 and 14, is refrigerated and maintained at a constant low temperature by any suitable refrigerating means, not shown. Preferably said refrigerating mechanism is seated in the lowermost portion of the main cabinet and refrigerating coils will lead therefrom around and adjacent to the elements within the section 12 so that the bottles on the conveyors therein will be kept at the desired low temperature. Suitable thermostat controls will be provided for maintaining said temperature at the desired point. It will be understood that the specific means for refrigerating the section 12 of the machine constitutes no part of the invention per se. Alternatively, the chilling action may be carried generally throughout the upper section 11 so that a preliminary cooling may be imparted to bottles on the trays, especially the lower ones.

Referring now in detail to the bottle-supporting and feeding means contained within the storage section 11, the same comprises a plurality of superposed shelves or trays 19 formed of sheet metal or similar light strong material having flat bottoms 20, upstanding walls 21 adjacent the bottom ends of the bottles and relatively short upstanding walls or lips 22 adjacent the top or neck end of said bottles. As appears from the drawings, the bottles are adapted to lie on their sides on the bottoms of said trays and to move therealong by gravity. The several trays are supported in superposed spaced relation in the upper section of the cabinet and are all inclined at a relatively gentle angle downwardly and rearwardly with respect to the fore and aft axis of the cabinet. The front or upper ends of the several trays are supported from uprights 25, the lower L-shaped ends 26 of which rest upon and are fastened to the upper face of dividing platform 13. Horizontal cross bolts 27 extend through the side walls of the trays adjacent the upper ends thereof and are fastened at either end to the outer faces of the uprights 25 as shown. The trays may be readily removed from said support by loosening nuts 28 at either end of the supporting bolts 27.

Said trays are also supported adjacent their lower ends by means of cross-bolts 30 which underlie the bottoms 20 of the trays and are fixed by means of nuts 31 in uprights 32 which are also supported at their flanged bottoms on the spacer 13. It will be observed that the uprights 25 and 32 are provided with a plurality of bolt holes adjacent the tray positions so that the trays may be spaced farther apart or closer together as desired to accommodate different sizes of bottles.

The lower or rear ends of the several trays 19 all terminate on a vertical line short of the rear wall 33 of the upper section 11. While, as shown, said rear wall is spaced inwardly from the rear wall 4 of the cabinet, in practice it has been found that the rear wall 4 of the cabinet itself may be employed, thus utilizing the additional space for longer trays and greater capacity. The space between the vertical wall 33 and the lower ends of the several trays 19 provides a vertical chute or passageway for bottles delivered from the ends of said inclined trays so that said bottles travel downwardly for delivery onto the upper reach of the conveyor in section 12. As shown, the horizontal guiding wall 13 is cut away at 35 to provide for movement of the bottles in said chute onto the conveyor.

In accordance with the invention, means are provided for causing all the bottles lying in the uppermost tray 19 to be delivered into the vertical chute before any of the bottles are moved in the next lower tray so that the delivery of bottles in the trays is successively effected tray-by-tray from the top to the bottom of the tier thereof. The relationship of such delivery is shown in Fig. 4 for example, while in Fig. 1 no bottles are shown in the several trays for convenience in illustrating the tray construction.

As shown in Figs. 1 to 5, each of the trays 19, except the uppermost one, is provided with a pivoted gate 40' which, in the normal operating position, is held substantially in a vertical plane bridging the space between two shelves so that the bottles on a given shelf cannot roll out into the vertical chute until the gate has been opened and swung into an elevated position, as shown in the upper part of Fig. 4. Said gate comprises a rectangular metal plate 40' of a size sufficient to completely bridge the space between two superposed shelves. The upper edge of the gate 40' is provided with an inwardly turned rectangular flange 41 which has in turn a vertically disposed flange or lip 42 extending the length of the gate. At the ends of said lip 42 are provided upstanding lugs or ears 43, from which extend studs 44. Said studs are journalled in the vertical faces of the uprights 32 so that the entire gate 40 is adapted to swing about the horizontal axis defined by said lugs. A relatively short pin 45 is fixed to the lower surface of the flange 41 and projects downwardly therefrom parallel to the main gate 40 so as to engage the surface of the lowermost bottle on the tray when the gate is closed as shown in the lower part of Fig. 4. Thus the pin 45 serves to restrain the lowermost bottle from bearing directly against the inner surface of the gate when the gate is closed.

Means for holding the gate closed comprises a slidable latch or bolt 46, which lies on the outer surface of the gate 40' and has limited sliding movement thereover being held to slide within a rectangular housing 47 which is fixed to the outer surface of the gate as shown. In its lowermost or locking position the latch 46 is adapted to extend downwardly below the lower edge of the gate 40 and so project into the space defined by a U-shaped hasp 47' which lies on the bottom of the shelf member 20 and projects sufficiently beyond the lower end thereof to engage the latch end as shown. The upper end of said latch extends upwardly beyond the housing 47 and is depressed to form an L-shaped extension 48, said extension having a pin and slot connection 49 to permit its being raised and lowered to lock and unlock the gate.

Means for raising and lowering the latch 46 is, in accordance with the invention, adapted to be actuated according to whether or not bottles are present adjacent the rear face of the gate in the vertical chute. That is, when the bottles in the vertical chute have travelled downwardly sufficiently to clear the space to the rear of the tray, the bottles on the tray above having been exhausted, means are provided for responding to the absence of bottles at that locus in the vertical chute to raise the latch and permit the gate to rise. For this purpose, in the embodiment shown in Figs. 1 to 5, I provide an actuating tongue or trigger member 50 which is spring-mounted to have limited resilient movement toward and away from the rear surface of the gate 40', said movement being effected by the presence or absence of bottles in the vertical chute lying adjacent said trigger. As shown, the trigger member 50 comprises a rectangular leaf adapted to extend over a portion of the rear face of the gate 40' and to rock about an axis parallel to that of said gate. The trigger 50 is provided at its upper end with a forwardly disposed flange 51 which is turned to be bent about and turn with a transverse shaft 52 which lies parallel to the studs 44 and runs across the upper flange 41 of the gate with respect to which it is rotatably mounted by means of perforated upstanding flange members 53. The trigger 50 is spring connected to turn to a limited extent with the shaft 52 by spiral springs 54. In the upper part of Fig. 4 said trigger is shown in its extended position, while in the lower part of Fig. 4 it is depressed by the presence of the bottles in the vertical chute bearing against it. The pin and slot connection 49 at the upper end of the latch 46 is connected to rock with the cross-shaft 52 so that when the trigger is depressed the latch is turned to its lower or locking position; while when the trigger springs to its extended position, the latch is raised. Thus when no bottle bears against the trigger, the latch is raised and the gate 40' is freed to swing rearwardly and upwardly to release the bottles on its shelf or tray.

Referring now to Fig. 6, there is shown a modified form of gate mechanism for controlling the movement of the bottles from the trays, which is considerably simpler and less expensive than that previously described. In this form the gate comprises a rectangular plate 60 adapted to bridge the space between the lower ends of two adjacent trays. The upper edge of said plate is stepped back by a substantially horizontal flange 61 and then turned upwardly and rearwardly to form an inclined flange 62 which is turned at 63 to receive transverse or stud shafts 64, the ends of which are mounted to turn in the uprights 32 like the stud shafts 44. A trigger comprising a rectangular plate 66 is journalled independently of the gate to rock freely about a cross-shaft 67, the ends of which are suitably fixed in any stationary framework of the machine. In the lower or closed position the gate 60 hangs downwardly so that its lower end lies near the rear edge of the tray bottom 20 and the trigger 66 also hangs downwardly and in that position the side of an adjacent bottle in the vertical chute bears against it. The weight of the bottle lying against the trigger 66 is multiplied by suitable leverage so that it holds its gate 60 closed and thereby restrains the row of bottles lying on the adjacent tray 20 from moving out into the vertical chute. This leverage is effected by an upstanding plate 70 fixed across the upper rear face of gate 60 and extending in prolongation thereof above the flange 61, thus bearing against the inner face of trigger 66 just below the axis 67 thereof. By virtue of this arrangement the force exerted by the bottles against the lower end of the trigger 66 is imparted to the upper end of the plate 70 and thus considerably multiplied so that a force sufficient to keep the gate 60 closed is exerted thereagainst at all times while the trigger 66 bears against bottles in the vertical chute. It will be noted that in its closed position (as shown in the lower part of Fig. 6) the lowermost bottle on the tray 19 bears against the corner formed by the flanges 61 and 62 of the gate and thus does not bear directly against the forward face of the gate 60 itself.

When the uppermost bottle in the vertical chute has passed the lower end of the trigger 66, absence of restraint against said trigger then permits the gate 60 to swing, under the pressure of the bottles on its tray, outwardly and upwardly into the position shown in the upper part of Fig. 6. By such movement the upper end of the plate 70 forces the trigger 66 upwardly and forwardly so that it lies in an upright position well above the gate 60.

It will be observed that this form of gate and trigger construction is considerably simpler in construction and operation from that previously shown and described. The number of parts is less and there is no spring mounting of any of the parts. Likewise there is no positive latching of the gates, all the parts being directly and positively controlled by the presence and weight of the bottles bearing against them.

In both forms of said gate construction, it will be noted that when the gate has been opened, it overlies the top of the column of bottles in the vertical chute and thus acts as an inclined guard or canopy, tending to guide the bottles downwardly as they roll off the tray. These bottles often move quite rapidly from the end of the tray, while the bottles in the vertical chute are moving slowly downwardly. Consequently a bottle will sometimes tend to be forced upward in the vertical chute by the pressure of the bottles in the tray behind it. The inclined lower surface of the gate tends to prevent such bottle from being so forced upwardly and becoming locked in the vertical channel between the rear wall 33 and the next oncoming bottle in the tray. Without such precaution, it has been found that a bottle will sometimes be locked and suspended in the vertical chute while the bottles below it feed along. This ultimately causes the lower trays to open and feed bottles before the upper tray has been emptied. Ultimately, the suspended bottle will shake loose and fall onto the opened gate below and thus lock the bottles in the lower tray which had opened prematurely. As stated, the construction of my gate prevents this from happening.

In the previous attempts to feed and deliver bottles which are disposed to roll on their sides, great difficulty has been encountered in avoiding uneven feeding movements. Due to the fact that many commercial bottles are not truly cylindrical and all of them have smaller necks than bases, they tend more or less to move irregularly instead of as true cylinders. This is particularly true of bottles having relatively long tapered necks such as that illustrated by the longer bottle shown in Fig. 3. Such bottles tend, when moving down inclined surfaces to tilt toward the neck end due to the fact that their basic outline is that of a cone rather than a cylinder. If this tendency is not corrected a stack of such bottles in an inclined or vertical chute will ultimately cause the group to tilt so that the uppermost bottles will ultimately be found very badly askew. Moreover the base end, which is of the greatest diameter, tends to roll more rapidly than the neck end thereby introducing further aberrations into the desired cylindrical or straight rolling motion. Another factor which tends to introduce irregularities into the movements of bottles so shaped and disposed is the tendency of the bottom ends, when bearing against a wall or other vertical surfaces to be retarded by the friction of such contact. All of these effects, taken together, in greater or less degree depending upon the shapes and profiles of the bottles, cause them to move so irregularly that they cannot be depended upon to feed smoothly and uniformly by gravity. Hence bottle vending machines in the past have largely resorted to positive belt feeds or mounting of the bottles on their bottom ends or other expedients which are cumbersome and expensive and complicated.

Figure 3:
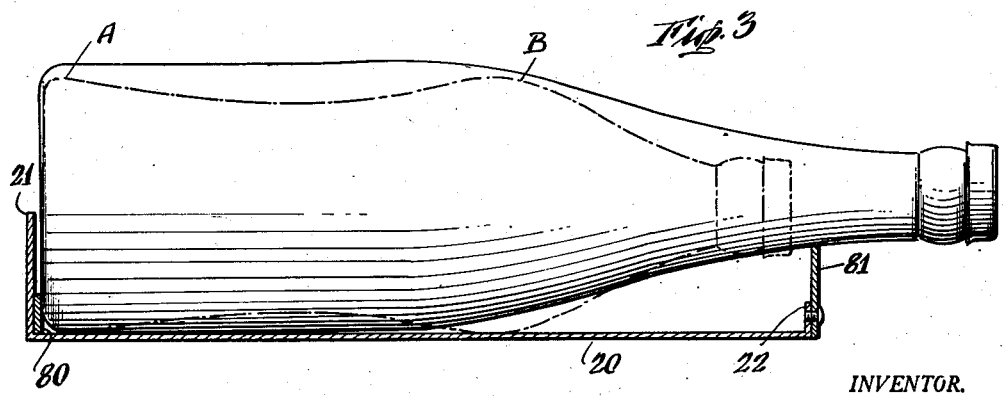
Fig. 3 is an enlarged detail in vertical cross-section on line 3—3 of Fig. 1 showing the adaptability of the mechanism to various sizes and shapes of bottles.

The present invention provides means for counteracting the tendency of bottles lying on their sides from rolling irregularly due to the factors described above. Referring first to the tendency of the bottoms of the bottles to be retarded by frictional contact with vertical walls, Fig. 3 illustrates a very simple device for overcoming this difficulty. As shown, the vertical wall 21 which contains the bottoms of the bottles in the trays 19 is prevented from substantial frictional contact with the bottoms of the bottles by means of a narrow spacer member 80 which extends a short distance up from the bottom of the tray and thus prevents all but a small part of the base of the bottle from having frictional contact with the vertical wall. Said spacer 80 may be a short flat plate as shown or may instead be an inclined surface across the rectangular corner between the walls 20 and 21. I have found that this simple arrangement will entirely overcome the irregularities of movement heretofore caused by contact of the bottoms of the bottles against such vertical wall. In the case of many bottles, such as the Coca Cola bottle illustrated in broken lines in Fig. 3, no other device is needed to insure regular cylindrical rolling motion. This is due to the fact that the Coca Cola bottle is essentially cylindrical, the widest points or shoulders A and B being spaced sufficiently far apart that the center of gravity of the filled bottle lies well between them and it will thus roll fairly true.

However, with the longer bottle illustrated by the full line shape shown in Fig. 3 (which is the profile of the present Pepsi Cola bottle), much greater difficulty is encountered because of the conical outline and the tendency of the long neck to project so far beyond the cylindrical portion of the bottle. To overcome these factors, I provide at the neck end of the shelf 19 an upstanding flange 81 attached to and in prolongation of the lip 22. Said flange 81 in its minimum height is designed to support the neck of the bottle, which overhangs it to some extent, so that the bottle will lie substantially level, i. e. parallel to its long axis on the tray bottom 20. I have found, however, that if said flange 81 be maintained at a uniform height throughout the length of the tray, the bottles will still tend seriously to turn and slide askew in their movement along the tray. Accordingly, I provide means for recurrently straightening out each bottle as it rolls and slides down the tray by successively retarding or holding back the neck end thereof and then intermittently allowing it to catch up and straighten out. In other words, by properly shaping the upper edge or contour of the flange 81 I am able to impart successive corrective motions to the neck of the bottle as it travels along the tray so that the bottles will travel essentially like true cylinders as they move down the tray. Such a shape or flange is illustrated in Fig. 1 where it will be seen that the upper edge of the flange 81 is provided first at 82 with a straight portion of minimum height. Next the flange 81 is sloped upwardly at 83 to catch and retard the neck of the bottle. Next an elevated straight portion 84 is provided and next a downwardly inclined ramp 85. Next comes a depressed straight portion 86 and then the above-described elevated portion is essentially repeated at 87. This shape or contour of the flange 81 has been arrived at empirically after much experimentation and I have found that with it all bottles, regardless of their length and shape, will be caused to travel essentially regularly and straight along inclined trays as shown.

However, it will be understood that the invention is not specifically limited to the particular form of neck-guiding flange shown and described. Any means for imparting successive corrective movements to the bottle necks, as by irregularities in the shape of their supporting surface, or by varying the friction or other retardant action on the top ends of the bottles, may be employed. For example, intermittent resilient or frictional pressure against the caps on the bottles may be found to effect essentially the desired straightening action and thus be an equivalent of the invention.

I have also found that it is most desirable to provide a similar control means in the vertical chute into which the bottles feed after leaving the trays. That is, the necks of the bottles are, in that situation, also caused to ride against a rail or surface of varying contour so that as they feed down the vertical chute their necks will be arrested and guided so as to impart an ultimately regular vertical motion to the bottles in the chute. As shown, this action is accomplished by causing the bottles to bear against vertical rail or guide members 90 and 91 in the vertical chute adjacent the ends of each set of trays. The rails 90, which contain the base ends of the bottles, may be flat vertical plates performing essentially the same functions as the vertical base walls 21 in the trays 19. I have not found it necessary in this arrangement to have a spacer member corresponding to the member 80 because the bottles are falling essentially vertically. However, the rails 91 which engage the necks of the longer bottles, such as the Pepsi Cola bottles shown in Fig. 3, will be provided with profiles essentially like those of the flanges 81 as shown, and will perform the equivalent function on the vertically moving bottles.

Referring now to the bottle conveying and delivery mechanism contained in the refrigerated section 12, said mechanism consists essentially of a pair of superposed belt conveyors 95 and 96. Conveyor 95 is adapted to travel horizontally so that its upper reach moves from the rear to the front of the machine, being guided about a rear horizontal roller 96' and driven by a forward roller 97, said roller being driven by belt and chain and sprocket connections from a drive motor 98 which is mounted on the outer face of wall 14, suitable openings being provided for the chain 99 to pass through said wall. The conveyor belt 95 is provided with a plurality of outstanding flights 100, said flights being spaced so as accurately to receive between them one and only one bottle at a time. As will be clear from Fig. 1, the bottles are advanced step-by-step by movement of the belt 95 until they travel around the forward roller 97 where they come against the downwardly and rearwardly curved plate 101 which is suspended as shown from the bottom of spacer 13. Said plate 101 is curved around the roller 97 and then has a horizontal portion 102 along which the bottles are directed rearwardly by the flights 100 to the rear end of said plate and adjacent the rear wall 103 of the section 12, said wall being also suspended from the plate 13. The second conveyor belt 96 lies suitably spaced below horizontal plate 102 and is designed to receive the bottle which is pushed from the rear end of said plate by the movement of the upper conveyor. Conveyor 96 runs parallel to and in the same direction as conveyor 95 and has flights 104 similarly spaced to engage and move the bottles forwardly. By suitable chain and sprocket linkage, as shown, the forward sprocket roller 105 of conveyor 96 is also driven from motor 98. Thus it will be seen that the bottles by means of these two conveyors are advanced step-by-step upon each energization of motor 98 so that ultimately the bottle which has been longest in the refrigerating chamber 12 reaches the delivery position at the front end of conveyor 96. While the conveyor as shown comprises three superposed flights, a lesser number may be found sufficient, especially where space is an important factor. In such case a single horizontal flight from the vertical chute to the delivery door may be used.

Means are provided for causing the foremost bottle on conveyor 96 to be delivered from the machine when the motor 98 is energized by deposit of a coin in the coin control therefor. Said delivery means includes a downwardly and forwardly inclined receiving tray 110 which extends forwardly from a delivery port 111 in wall 14 through a suitable opening 112 in outer wall 5 of the cabinet just below the bottom of the access door 10. The tray 110 projects a sufficient distance beyond the opening 112 so that a bottle delivered into the rear end of the tray will roll forward and be accessible for removal by hand from the forward end of the tray outside the wall 5, said tray being provided with a terminal retaining lip 113.

Referring now to the preferred means for automatically delivering the bottle into tray 110 from the end of conveyor 96, I provide an automatic, normally locked door 115 which when closed lies flush with wall 14 and is adapted to drop under the weight of a bottle to permit same to roll onto tray 110. The door 115 is designed to move downwardly through a slot or opening 116 formed at the rear edge of tray 110, said movement being permitted by virtue of the mounting of the door at the forward end of horizontally extending lever arm 117. Said lever is fulcrumed at 118 near the rear of the cabinet so that downward movement of the door will take place almost in a vertical plane. The rearwardly extending portion 119 of the lever is adjustably weighted at 120 so as normally to hold the door in its elevated position.

Means are provided for normally locking the door in said elevated or closed position and permitting same to open only when a bottle is delivered thereto by movement of the conveyor 96. Means are also provided for causing the motor 98 to be de-energized as soon as the bottle has been caused to roll off the conveyor 96, thereby preventing the feeding of more than one bottle while the door is opened. As embodied, the door is normally locked against opening movement by a latch 125, said latch being connected for locking and unlocking movement of the lever with an actuating trigger or lever member 126 which normally lies in an elevated position in the path of an oncoming bottle delivered from the end of the conveyor 96. When the bottle rolls off the conveyor it encounters and depresses the trigger 126 thereby moving latch 125 out of engagement with fixed bar 127 and permitting the door 115 to sink due to the weight of the bottle on the trigger member 126. As the door 115 and inclined trigger 126 sink together under the weight of the bottle, the bottle rolls out onto tray 110 and the door immediately swings back into elevated position and relocks. The latch 125 and the trigger 126 are spring urged to return to locking position.

Above the upper edge of the door and mounted on the inner face of wall 14 is a plate 130 which is so positioned as to engage any part of the bottle as same rolls off the conveyor and onto the trigger plate 126. Said plate 130 is connected to a horizontally disposed rod 131 which is slidably movable through a conforming aperture 132 in wall 14. The rod 131 is somewhat longer than the thickness of wall 14 and has mounted at its outer end an upwardly projecting rigid member 133. When the rod 131 has been moved outwardly by contact with the bottle, the upper end of member 133 is designed to contact and move arm 135 of a normally open microswitch 136, the closing of which switch results in the interruption of the circuit of conveyor motor 98 as hereinafter described. Consequently, the movement described causes the motor and conveyor to be stopped as the bottle is delivered from the machine and hence any possibility of a second bottle being delivered while the door is opened is obviated. As soon as the bottle has moved past the movable contact plate 130, the rod 131 is slid backwardly into the cabinet by means of a suitable spring 137 so that the switch 136 will open again and the control therefor be in position to encounter the next bottle.

A modified arrangement for the motor control switch is shown in Fig. 7. The micro-switch 136' is mounted on the wall 14 and is arranged in a circuit similar to switch 136. An operating arm 137 prime extends from a block 138 prime on the outer face of the delivery door 115 to actuate switch 136 prime. The arm 137 prime, which is preferably provided with a roller, holds the switch open so long as the door is in its upper or closed position. As soon as the door goes down to open, the arm moves off the block and the switch is closed to bring about action resulting to cut the current to the conveyor motor. The switch is again opened when the door returns.

It will be understood that the above-described door construction has numerous advantages. The lock therefor being inside the cabinet, it is impossible for anyone outside to reach into or gain access to the interior of the machine to get a bottle, except in the normal way. The vertical movement of the door and its arrangement is such that a minimum amount of warm air can get into the refrigerated chamber. Moreover, it will be noted that both the switch 136 and the opening of the door itself are actuated solely by the weight of the bottle being ejected.

That feature of the invention which assures maintenance of a chilled reserve of bottles retained on the conveyor, after the supply in the overhead section 11 has been exhausted, will now be described. It is desired to stop the feed of bottles by breaking the power circuit for conveyor motor 98 as soon as the last bottle has been fed from the bottom tray 19, so that when there are no more bottles in the storage section 11 the machine will stop delivering bottles. At that point in the operation the flights of the horizontal conveyor will remain charged with bottles, which will be maintained at the temperature of refrigeration in the thermostatically controlled chilling section 12, but the machine will deliver no more bottles into the dispensing tray 110 until the trays 19, or at least some of them, have been replenished. As soon as some fresh bottles, regardless of how many, have been placed in the bottom tray 20, the motor circuit will be restored so that dispensing can recommence. The bottles then delivered will be those from the reserve supply which have been resting on the horizontal conveyor, so that they will always be at the chilled temperature no matter how quickly the machine has been refilled and no matter how many warm bottles have been added by the reloading.

The embodied means for accomplishing this object of the invention comprises a micro-switch 163 in the circuit for conveyor motor 98 which is normally closed by weight of bottles in the lowermost tray. Said switch rests on the partition 13 and underlies the lower end portion of the bottom tray 19. The switch is designed to open only when the last bottle has been fed off the bottom tray 19. For that purpose the lower end portion of the bottom 20 of said bottom tray is formed as a separate, hinged plate split into two separate parallel leaves 155 and 156 both mounted to extend in prolongation of bottom 20 and hinged to turn about horizontal pivot rod 158 at the end of bottom plate 20. A hinge spring 159 is disposed to urge the plates 155, 156 upward, said plates normally being held flat in prolongation of the tray bottom 20 by the weight of the bottles resting thereupon. This general structure is all supported by an L-shaped foot 160 formed at the bottom of each of the uprights 32. Cross rod 161 supports the lower end of the bottom tray 20 and the hinge pin 158 is also supported at either end in said plates 160. Latch engaging hasp 47' is formed at the rear end of plate 155 in the same manner as with the upper tray bottoms. Switch 163 underlies plate 155 so that when the last bottle has rolled off the end of said plate, the rising of the plate will open the switch and thus cut the conveyor motor.

For the purpose of operating the telltale light and guard for blocking the coin chute, hereinafter described, a switch 150 is provided mounted on the outside of wall 14. The operating arm 151 of said switch is fixed to and projects upwardly from near one end of a slidable actuator rod 152 which extends through wall 14 and said rod is normally urged by spring 153 toward the left as shown in Fig. 1, to switch closed position. The rear or inner end of switch rod 152 is suspended from the bottom of plate 156 by means of an apertured bracket plate 165, through which said rod is mounted to slide. A stop nut 166 is fixed to the end of the rod so that, as shown in Fig. 4, the rising of plate 156 will cause bracket plate 165 to push against nut 166 and thus retract the rod 152 to close switch 150 and operate the telltale light and block for the coin chute. Plate 155 is designedly made longer than plate 156 so that the last bottle on the bottom tray will fall freely from the end of the tray onto the conveyor below, but the bottle conveyor motor will remain energized until the last possible contact with the falling bottle has been relinquished so that the final bottle at the front end of the conveyor will be delivered with certainty before the motor is deenergized.

There is shown in Figs. 8, 9 and 10 an illustrative form of coin control mechanism adapted for use with the vending machine hereinabove described. Said coin control mechanism is adapted to receive coins designated to select bottles from either conveying unit of the machine. In the event the machine is loaded with bottles of identical content and beverage in both units, then said control mechanism is adapted to alternately draw on the two delivery units so as to empty the machine evenly. Means may also be provided for indicating when either bottle supply unit has been emptied and to prevent feeding coins to actuate said unit when it is emptied.

As embodied, the coin control mechanism comprises two coin chutes 200 and 201 corresponding to the two units of the machine. Said chutes are of Siamese construction joining in a common chute 203 at their bottom part, which chute leads into a bad coin detector or "slug ejector" 204 which is of conventional design and not shown in detail. Bad coins are rejected through the rejection chute 205. From the bottom of the slug ejector 204 superposed crosswise coins chutes 206 and 207 are pivotally mounted on a bar 208 so that by tilting same as shown in Fig. 9 one or the other of said cross chutes will receive a coin from the detector unit 204. The bottoms of the pivoted chutes 206 and 207 communicate respectively with vertical chutes 209 and 210, in each of which are positioned motor control switches for the two conveyor motors.

Means are provided for selectively tilting the cross chutes 206 and 207 so as to direct a coin to the appropriate motor switch chute 209 or 210 as determined by the deposit of the coin in the selected chutes 200 or 201. That is, if the chute 200 corresponds to Coca-Cola flavor carried by the right hand unit of the machine, the dropping of a coin into the chute 200 will cause the coin ultimately to fall into motor control chute 209 there to actuate the operating switch for conveyor motor 215. If the coin is dropped in the other chute 201, corresponding to the Pepsi-Cola unit at the left of the machine, the coin will be directed into the motor control chute 210 to energize motor 216 for that unit. The motors 215 and 216 each correspond to a motor 98 shown and described in Fig. 1 in connection with one unit of the machine. The means for effecting this selective control comprises in the illustrative form shown a coin operated gravity switch 220 in the chute 200 and a similar switch 221 in chute 201. As will appear in Fig. 9 each of the chutes 200 and 201 are divided in an intermedial portion of their lengths into superposed parallel channels 222 and 223 and divider or deflector plates 224 are pivotally mounted at the throat or top ends of said divided chutes. The switches 220 and 221 lie in the outer channels 223 of said divided chutes so that they are actuated only in the event switch plate 224 is in the rear position as shown in Fig. 9. A similar deflector plate 225 is provided in coin chute 201 and is mounted to lie in the opposite sense to that of plate 224 in chute 200. An actuating bar 226 centrally pivotally mounted is mounted to control the position of the two switch plates 224 and 225 by rocking movement through slot connection with levers attached to the switch plates, as shown in Figs. 8 and 9. The bar 226 is adapted to be rocked by a rotary cam 227 which is adapted to be operated by the yoked arm 228 carried by the armature of solenoid 229. Said solenoid 229 is also provided with a lower arm 230 carried by its armature which is linked to operate a rotary cam or crank 231, which crank is connected to rock cross shaft 208 and thereby control the position of the two pivoted cross chutes 206 and 207. As shown, the arms 228 and 230 are yoked to engage projections on the cams 227 and 231 respectively to rotate the cams and rock bar 226 and shaft 208 respectively when solenoid 229 is energized and arms 228 and 230 moved upwardly. Upon de-energization of solenoid 229 the arms 228 and 230 move downwardly by gravity, and the cams 227 and 231 resume their former positions by action of the weights operating on the axes thereof, as shown.

Considering the operation of the mechanism so far described, when a coin is dropped into chute 200, it will fall into contact with switch arm 220, assuming that the deflector plate 224 is in the rear position as shown in Fig. 9. Contact with switch 220 will close the circuit to solenoid 229 causing plate 224 to swing forward and thereby open the throat of parallel channel 222. Simultaneously, the deflector plate 225 in chute 201 will be moved to open its switch channel 223 so that the next coin dropped into chute 201 will operate switch 221. If the second coin be also fed to chute 200 it will pass directly downwardly through chute 222 by passing switch 220 and thus not affecting the solenoid 229. The energization of the solenoid, by operation of switch 220 as stated, will also cause cross bar 208 to be rocked to position the chute 206 as shown in Fig. 9 so that the coin will fall into corresponding conveyor motor chute 209 as shown. However, if the next coin is dropped into coin chute 201 it will go into the outer channel thereof and actuate switch 221, the deflector plate 225 having been appropriately positioned by the last motion of the solenoid actuated bar 226. The actuation of switch 221 will cause the solenoid to switch chute 207 into coin receiving position and thereby cause that coin to move into motor control chute 210.

Referring now to the means for controlling the operation of the conveyor motors 215 and 216, each of the coin chutes 209 and 210 is designed to hold a coin, such as C, in motor-switch-closing position until the conveyor has been moved to deliver one bottle through the delivery port 111 by actuation of door 115. The motion of the bottle, as previously described, concurrently operates motor control switch 136 to break the motor energizing circuit. The embodied means for effecting this operation is shown in Figs. 8, 9 and 10, comprising a pivoted switch arm 235 against which the coin C lies and in such position holds the circuit closed for motor 215. A coin-retarding member 236 is retractably mounted against the face of chute 209, said member having a pin 237 which projects into the chute 209 and in its innermost position serves to hold the coin against the switch bar 235. When member 236 is retracted the coin C is released and is free to fall out of chute 209, thereby allowing switch arm 235 to spring back and open the motor circuit. The embodied means for so controlling the movement of coin retarding member 236 comprises a solenoid 240, the armature 241 of which is connected to a link 242 which serves to rock member 236 about its upper pivot 236'. The solenoid 240 is energized upon the closing of switch 136 by action of the bottle being delivered, as will be clear from the circuit connections shown in Fig. 10. A similar coin retarding member 250 is provided for coin chute 210 and is actuated by a rocker bar 251 connected to the solenoid armature as shown.

In accordance with the invention, the coin control circuit is also designed to cooperate with the controls for switches 150 so that either conveyor motor circuit will be wholly de-energized when the last bottle has been fed from the lowermost tray 19 onto the corresponding conveyor as previously described. For this purpose switches 163 are placed across the respective main lines so as to break the motor control circuit for motor 215 or 216 in series therewith. The closing of a switch 150 also upon feeding the last bottle from the lowermost tray 19 serves to energize the circuit for a telltale light 260 so that when the last bottle has been fed, as described, by that unit the light will be lit adjacent the coin chute to indicate that that unit has been emptied. Similarly a coin chute bar 261 is allowed to drop when solenoid 262 in the same circuit is energized to block access to the corresponding coin chute 200.

It remains to describe how the mechanism is adapted to alternate the operation of motors 215 and 216 when the bottles of beverage in the two conveyor units are identical. For this purpose the cross bar 226 of the solenoid-operated coin switch mechanism is removed and a single coin is used with the plate 224 therein set to deflect all coins through chute 223, thereby causing the coins in whichever of the two chutes 200 or 201 is used to operate the solenoid control switch 220 (or 221 as the case may be) every time a coin is dropped. This change causes the solenoid 229 to be operated each time a coin is dropped and thereby the coins are alternately delivered first to motor chute 209 and next to motor chute 210 by pivoting of chutes 206 and 207.

It will be understood that the coin control mechanism herein shown and described is merely illustrative of an embodiment designed to perform the various functions desired to give maximum flexibility to the operation of the machine. However, the same functions can and preferably may be performed by a series of relays in a more completely electrified control and it will be understood that such relay system is within the scope of my invention and claims directed to this feature thereof.

The invention in its broader aspects is not limited to the specific mechanisms shown and described but departures may be made therefrom within the scope of the accompanying claims without departing from the principles of the invention and without sacrificing its chief advantages.

What I claim is:

1. In a bottle dispensing machine in combination means for maintaining a column of necked bottles lying on their sides one above the other, means for successively removing the lowermost bottle in the column for dispensing, the bottles above it moving by gravity toward the point of removal, a member bearing against the necks of the bottles and means carried by said members for imparting a varying restraint to gravity movement at the neck ends of the bottles in the moving column to maintain the bottles moving generally like regular cylindrical objects on such support.

2. In a bottle dispensing machine in combination means for maintaining a column of necked bottles lying on their sides one above the other, means for successively removing the lowermost bottle in the column for dispensing, the bottles above it moving by gravity toward the point of removal, a member engaging the bottle necks and projecting to varying extents into the path of the bottle necks for imparting a varying gravital restrain to the neck ends of the bottles in the moving column to maintain the bottles moving generally like regular cylindrical objects on such support.

3. In a bottle dispensing machine in combination means for maintaining a column of necked bottles lying on their sides one above the other, means for successively removing the lowermost bottle in the column for dispensing, the bottles above it moving by gravity toward the point of removal, and a member projecting to varying extents into the path of the bottle necks for imparting a varying frictional restraint to the neck ends of the bottles in the moving column to maintain the bottles moving generally like regular cylindrical objects on such support.

4. In a bottle dispensing machine in combination means for maintaining a column of necked bottles lying on their sides one above the other, means for successively removing the lowermost bottle in the column for dispensing, the bottles above it moving by gravity toward the point of removal, and means for imparting a varying restraint to the neck ends of the bottles in the moving column to maintain the bottles moving generally like regular cylindrical objects on such support, said means comprising a member bearing against the surface of the necks of said bottles.

5. In a bottle dispensing machine in combination means for maintaining a column of necked bottles lying on their sides one above the other, means for successively removing the lowermost bottle in the column for dispensing, the bottles above it moving by gravity toward the point of removal, and means for imparting a varying restraint to the neck ends of the bottles in the moving column to maintain the bottles moving generally like regular cylindrical objects on such support, said means comprising a member of non-rectilinear contour bearing against the surface of the necks of said bottles.

6. In a bottle dispensing machine in combination means for maintaining a column of necked bottles lying on their sides one above the other, means for successively removing the lowermost bottle in the column for dispensing, the bottles above it moving by gravity toward the point of removal, and means for imparting a varying restraint to the neck ends of the bottles in the moving column to maintain the bottles moving generally like regular cylindrical objects on such support, said means comprising a guide rail of varying contour bearing against the surface of the necks of said bottles.

7. In a bottle dispensing machine in combination means for maintaining a column of necked bottles lying on their sides one above the other, means for successively removing the lowermost bottle in the column for dispensing, the bottles above it moving by gravity toward the point of removal, and a series of projections in the path of the bottle necks for successively correcting the tendency of said bottles to depart from a rolling attitude parallel to the general movement of said column.

8. In a bottle dispensing machine in combination means for maintaining a column of necked bottles lying on their sides one above the other, means for successively removing the lowermost bottle in the column for dispensing, the bottles above it moving by gravity toward the point of removal, and means for imparting corrective movements to the neck ends of said bottles to tilt the bottles on their major axes and thereby to maintain them moving like regular cylindrical objects under the influence of gravity, said means comprising a neck-engaging member having at least one portion projecting farther into the column than other portions thereof.

9. In a bottle dispensing machine in combination a support for a plurality of bottles lying on their sides, said support being inclined to cause said bottles to move by gravity therealong, and means for successively imparting corrective movements to the neck ends of said bottles to tilt the bottles on their major axes and thereby to maintain them moving like regular cylindrical objects under the influence of gravity, said means comprising an inclined support for the bottle necks having elevated portions alternating with depressed portions.

10. In a bottle dispensing machine in combination a support for a plurality of bottles lying on their sides, said support being inclined to cause said bottles to move by gravity therealong, and means for imparting a varying restraint to the movement of the neck ends of the bottles as they travel along said support to cause said bottles to travel substantially like regular cylindrical objects on such support, said means comprising a member underlying the necks of said bottles on the support and being of varying height so as to successively raise and lower the necks of the bottles with respect to the plane of said support.

11. In a bottle dispensing machine in combination a support for a plurality of bottles lying on their sides, said support being inclined to cause said bottles to move by gravity therealong, and means for imparting a varying restraint to the movement of the neck ends of the bottles as they travel along said support to cause said bottles to travel substantially like regular cylindrical objects on such support, said means comprising a member underlying the necks of said bottles on the support and being of varying inclinations so as to successively retard and accelerate the downward movement of the neck ends of said bottles with respect to the base portions thereof.

12. In a bottle dispensing machine, in combination, means defining a path for the guided travel of a bottle in a direction substantially transverse to the axis of the bottle, and means for imparting a varying restraint to the movement of the neck end of the bottle as it travels along said path to cause the bottle to travel substantially like a regular cylindrical object along said path said last means comprising guide elements of varying contour adapted to be engaged by the neck surface of the bottle.

13. In a bottle dispensing machine, in combination, means defining a path for the guided, gravitational travel of bottles associated in a column with the axes of the bottles substantially parallel, said travel taking place along said path in a direction substantially transverse to the axes of the bottles, and means for imparting a varying restraint to the movement of the neck ends of the bottles as they travel along said path to cause the bottles to travel substantially like regular cylindrical objects along said path, said means comprising a member of non-rectilinear contour to be engaged by the surface of the necks of the bottles.

WADE W. BOWMAN.

REFERENCES CITED

The following references are of record in the file of this patent:

UNITED STATES PATENTS

| Number | Name | Date |
| --- | --- | --- |
| 979,814 | Westerbeck | Dec. 27, 1910 |
| 1,358,388 | Neibel | Nov. 9, 1920 |
| 1,718,102 | Bauer | June 18, 1929 |
| 1,902,612 | Blossom et al. | Mar. 21, 1933 |
| 2,150,863 | Morin | Mar. 14, 1939 |
| 2,233,118 | Williams | Feb. 25, 1941 |
| 2,304,484 | Smith | Dec. 8, 1942 |
| 2,376,561 | Smith | May 22, 1945 |
| 2,376,960 | Clem | May 29, 1945 |
| 2,390,535 | Higham | Dec. 11, 1945 |
| 2,398,543 | Lo Cascio et al. | Apr. 16, 1946 |
| 2,407,402 | Clem | Sept. 10, 1946 |
| 2,408,380 | Dennis | Oct. 1, 1946 |